United States Patent [19]

Smith

[11] Patent Number: 4,666,216

[45] Date of Patent: May 19, 1987

[54] EMERGENCY WHEEL MOUNTABLE ON VEHICLE WHEEL AND METHOD OF USE

[76] Inventor: Irving Smith, c/o Arrow Art Finishers, 2020 White Plains Rd., Bronx, N.Y. 10462

[21] Appl. No.: 799,307

[22] Filed: Nov. 18, 1985

Related U.S. Application Data

[63] Continuation-in-part of Ser. No. 766,257, Aug. 16, 1985, abandoned.

[51] Int. Cl.⁴ .............................................. B60B 15/26
[52] U.S. Cl. ................................ 301/39 C; 301/40 S; 301/39 R
[58] Field of Search .............. 301/13 R, 13 SM, 36 R, 301/36 WP, 38 R, 39 R, 39 C, 39 CC, 39 T, 40 R, 40 S, 41 R, 44 R, 44 T; 152/217, 218, 225 R, 225 C

[56] References Cited

U.S. PATENT DOCUMENTS 4,127,305  11/1978  Nielsen .............................. 301/36 R

FOREIGN PATENT DOCUMENTS

660155  3/1963  Canada .............................. 301/38 R
436970  2/1940  France .............................. 301/39 C
857897  1/1961  United Kingdom .............. 301/39 C Primary Examiner—David A. Scherbel
Attorney, Agent, or Firm—Kirschstein, Kirschstein, Ottinger & Israel

[57] ABSTRACT

A rapidly-mountable spare wheel intended for emergency roadway use of a wheeled vehicle in the event of a flat tire condition of one of the main wheels of the vehicle is mounted outwardly alongside the main wheel for joint rotation therewith in a side-by-side mounted state during the flat tire condition.

20 Claims, 12 Drawing Figures

EMERGENCY WHEEL MOUNTABLE ON VEHICLE WHEEL AND METHOD OF USE

CROSS-REFERENCE TO RELATED APPLICATION

This application is a continuation-in-part application of my pending U.S. application Ser. No. 766,257, filed Aug. 16, 1985, now abandoned.

BACKGROUND OF THE INVENTION

1. Field of the Invention

This invention generally relates to a spare wheel for and method of rendering a wheeled vehicle operational for emergency roadway use in the event of a flat tire condition of a main wheel of the vehicle and, more particularly, to a spare wheel which is very rapidly and easily mounted alongside the main wheel.

2. Description of the Prior Art

It is customary to change a flat tire on a vehicle such as an automobile by jacking up the automobile so that the flat tire is lifted off the ground and, thereupon, by removing the main wheel on which the flat tire is mounted in an axially outward direction. Then a spare wheel is substituted for the removed wheel. The spare wheel may be a full-size or, in some late model cars, a reduced-size replacement. In either event, the main wheel with the flat tire must be entirely removed from the vehicle so that the spare wheel can be substituted therefor.

Although such tire changing techniques and apparatuses are generally satisfactory for their intended purpose and have, in fact, been in use for many years, they have not proven to be altogether convenient or safe to utilize in practice. For example, many individuals do not have the inclination or the strength to jack up an automobile, remove the main wheel having the flat tire, and then substitute the spare wheel for the removed wheel. Also, it could happen that the automobile may slip off the jack and, if this occurs when the main wheel is off, considerable damage could result to the automobile. In addition, often the tire on the spare wheel is not sufficiently inflated, so that it is useless until reinflated. In addition, the full-size and, to a lesser extent the reduced-size, spare wheels are still undesirably heavy and large, and occupy too much of the available space in the vehicle trunk or rear compartment. This available space is more and more at a premium as automobiles and their correspondingly-sized trunk compartments are downsized.

SUMMARY OF THE INVENTION

1. Purposes of the Invention

It is a general object of this invention to overcome the aforementioned drawbacks of the known tire-changing techniques and apparatuses.

It is another object of this invention to reduce the disinclination and the relatively large strength requirement involved in changing flat tires.

It is a further object of this invention to render a vehicle operational despite the existence of a flat tire condition without requiring the flat tire and the wheel on which it is mounted to be removed from the vehicle.

It is yet another object of this invention to eliminate the possibility of damage to a vehicle should the latter slip off a jack when the main wheel having the flat tire is off the vehicle.

It is still another object of this invention to eliminate the possibility that the spare tire is deflated and, hence, unusable.

It is yet a further object of this invention to reduce the size and weight of a spare wheel and to minimize the volume it occupies in a vehicle trunk or rear compartment.

It is another object of this invention to provide a reliable, safe, convenient, quick, easy to use method of dealing with flat tire conditions.

It is still another object of this invention to provide a novel spare wheel which is quickly and easily installed on vehicles, and which is durable and inexpensive to manufacture.

2. Features of the Invention

In keeping with these objects, and others which will become apparent hereinafter, one feature of this invention resides, briefly stated, in a spare wheel for and method of rendering a vehicle operational for emergency roadway use in the event of a flat tire condition of a main wheel of the vehicle.

The main wheel is of the type which includes a main rim mounted on the vehicle for rotation about an axis, and having a main hub with an outwardly-facing hub wall. The main wheel also includes a tire mounted on the main rim, and having an outwardly-facing side wall. In the event of a flat tire condition, this tire on the main rim becomes flat.

The main wheel further includes a plurality of threaded studs arranged in an annulus about the axis and extending axially through the main hub. The main wheel additionally includes a plurality of lug nuts threadedly mounted on the studs and engaging the main hub of the mounted main rim.

In accordance with this invention, the spare wheel is mounted outwardly alongside the main wheel having the flat tire for joint rotation with the main wheel in a mounted state during the flat tire condition. The spare wheel comprises an auxiliary rim and a spare tire mounted thereon.

In a first embodiment, the auxiliary rim has a hub portion engaged with the hub wall of the main rim in the mounted state. The auxiliary rim also has an annular flange portion engaged with the side wall of the flat tire in the mounted state.

In order to mount the spare wheel alongside the main wheel, at least one of the nuts is removed from its respective stud. At least another of the nuts is non-removably maintained on its stud to maintain the main wheel on the vehicle.

The hub portion has wall parts bounding at least one mounting hole through which the one stud is inserted, and extends in the mounted state after the at least one nut is removed from the one stud and then replaced on the same into engagement with the wall parts. The hub portion also has additional wall parts bounding at least one clearance hole in which the other stud and the other nut maintained thereon are received with clearance in the mounted state.

In the first embodiment, five threaded studs and their corresponding five lug nuts are employed to mount the main wheel on the vehicle; and the hub portion is formed with three mounting holes through which three studs respectively extend in the mounted state after the three lug nuts are removed from their respective studs. The hub portion is also formed with two clearance holes in which the remaining two studs and two nuts maintained thereon are respectively received with clearance in the mounted state. In vehicles using greater or fewer numbers of stud nut pairs, the numbers of mounting holes and clearance holes correspondingly vary.

In a second embodiment, the auxiliary rim has a hub portion on which a raised abutment or tongues are provided for engagement with a main flange on the main wheel. In order to mount the spare wheel alongside the main wheel, the lug nuts are sequentially removed from the studs on which they are mounted. The hub portion has wall parts bounding a plurality of mounting holes. A plurality of elongated fittings or extensions are mounted between the hub wall and the hub portion. Each extension has a tapped bore in which a respective stud is threadedly received after its nut has been removed therefrom. Each extension also has a threaded portion extending through an associated mounting hole. The removed nut is threaded onto the threaded portion until the nut engages the wall parts bounding the respective mounting hole. The installation is completed after all the nuts have been removed, each in its turn, from their initial mountings on the studs; after all the extensions have been mounted, each in its turn, on the studs; and after all the removed nuts have been mounted, each in its turn, on the extensions.

In a third embodiment, the lug nuts are not removed from the studs on which they are mounted, but are left thereon. Each lug nut has a threaded passage having a first axial end region in which a respective stud is threadedly received, and a second axial end region in which a threaded shaft of each of a plurality of extension bolts is threadedly received. Each bolt shaft extends through a respective mounting hole formed in the hub portion of the auxiliary rim. Each bolt has a head which engages the wall parts of the hub portion bounding each mounting hole.

In another embodiment, the spare wheel is mounted not only without requiring the removal of the lug nuts from their respective studs, but also without utilizing fittings or extension bolts which are discrete from the auxiliary rim and, therefore, prone to becoming misplaced or lost, and unavailable when needed in an emergency. Thus, a set of connectors is arranged on the auxiliary rim, each connector having a stationary part stationarily mounted on the auxiliary rim, and a hook-shaped movable part mounted on the auxiliary rim for movement relative to the stationary part from a ready position in which the movable part is remote from the main rim, to a mounted position in which the movable part enages the main rim. The movable part may be mounted for threaded movement in a fourth embodiment of this invention, or may be mounted for snap-action movement in a fifth embodiment of this invention.

For each embodiment, the spare tire is mounted around the annular flange portion of the auxiliary rim. The spare tire has an outer diameter larger than that of the flat tire, and is operative for supporting the flat tire above the roadway in the mounted state. This enables the vehicle to be moved along the roadway, despite the existence of the flat tire condition, without the necessity for removing the flat tire from the vehicle. Hence, the spare wheel may be quickly and easily installed on the vehicle alongside the main wheel. The spare wheel assumes the primary burden of supporting the vehicle in the region of the main wheel having the flat tire. The spare wheel, in accordance with this invention, is light in weight and compact in size, and does not occupy a great deal of available space in the trunk or rear compartment of the vehicle. The spare wheel is easy to handle and position against the main wheel, and is intended for emergency roadway use only, and not as a permanent wheel replacement.

The novel features which are considered as characteristic of the invention are set forth in particular in the appended claims. The invention itself, however, both as to its construction and its method of operation, together additional objects and advantages thereof, best will be understood from the following description of specific embodiments when read in connection with the accompanying drawings.

DETAILED DESCRIPTION OF THE PREFERRED EMBODIMENTS

Figure 1:
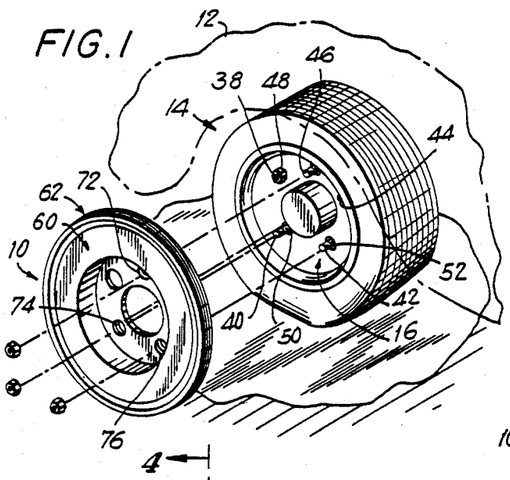
FIG. 1 is a perspective exploded view of one embodiment of a spare wheel prior to being mounted alongside a main wheel having a flat tire, in accordance with this invention.
Figure 2:
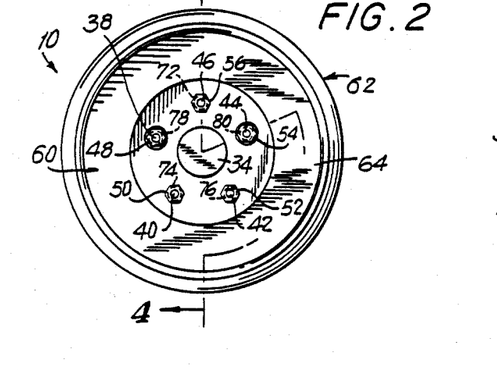
FIG. 2 is a front view of the spare wheel of FIG. 1 after being mounted alongside the main wheel.
Figure 3:
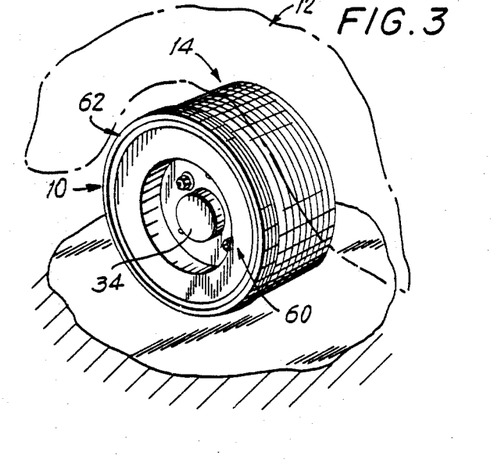
FIG. 3 is a perspective view of the spare wheel of FIG. 1 after being mounted alongside the main wheel.
Figure 4:
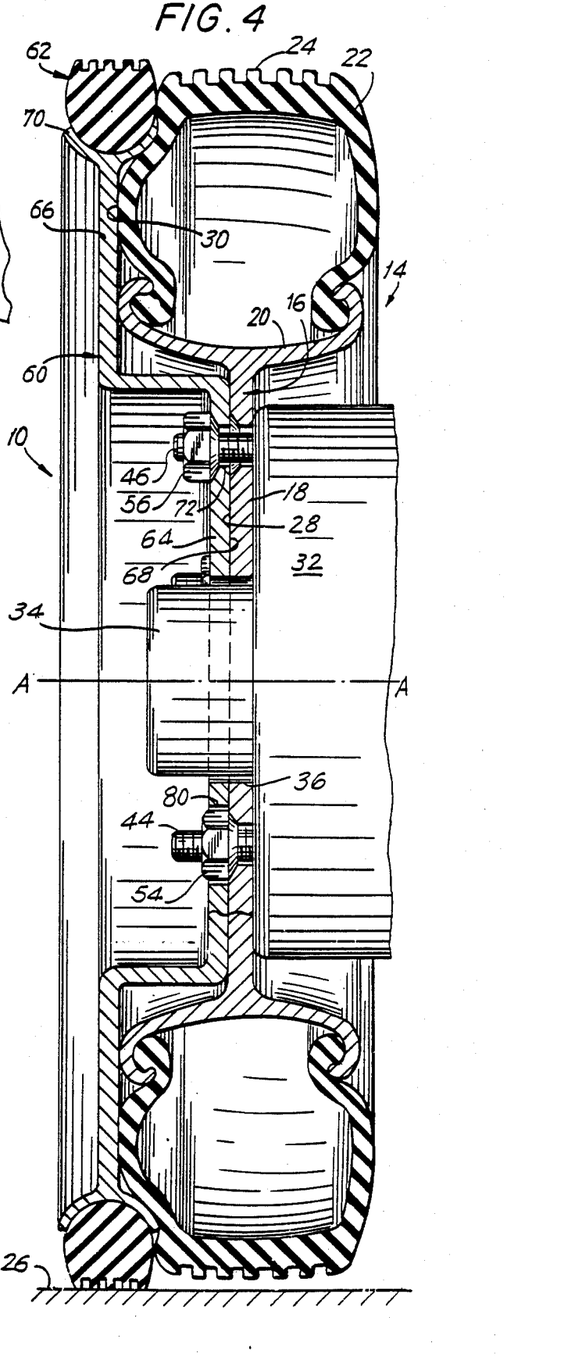
FIG. 4 is an enlarged sectional view taken along the broken line 4—4 of FIG. 2.

Referring now to the drawings, reference numeral 10 generally identifies a spare tire intended for emergency roadway, limited-service, use on a vehicle, e.g. an automobile, a portion of whose body 12 is shown in broken-away phantom lines in FIGS. 1 and 3, in the event of a flat tire condition or malfunction of a main wheel 14 of the vehicle. The main wheel 14 is entirely conventional and, in the case of an automobile, may be any one of the front or rear wheels. As best shown in FIG. 4, the main wheel 14 includes a main rim 16 mounted on the vehicle for rotation about an axis A—A. The main rim 16 has a main hub 18, and an annular main flange 20 located radially of the main hub. A tire 22, and in the event of a flat tire condition, a flat tire 22, is mounted on the annular flange 20. The tire 22 may be of any conventional tire construction in common use on vehicles, e.g. tubeless, tubed, etc. The tire 22 has a circumferentially-extending tread 24 which, when the tire 22 is not flat, engages a roadway 26. The main hub 18 has an outwardly-facing hub wall or surface 28. The tire 22 has an outwardly-facing carcass or side wall 30.

The main wheel 14 is mounted on the vehicle adjacent a brake assembly 32 having a bose 34 which extends axially through a central opening 36 in the main hub 18. A plural of threaded studs and, as shown in the drawings, by way of non-limiting example, five studs 38, 40, 42, 44, 46 are equiangularly arranged in an annulus about axis A—A and extend through and past the main hub 18. A corresponding plurality of five lug nuts 48, 50, 52, 54, 56 are threadedly mounted on studs 38, 40, 42, 44, 46 and are movable along the latter for engagement with the main hub 18 and, more particularly, into engagement against the hub wall 28 in order to mount the main rim 16 and, in turn, the tire 22 securely to the vehicle. Further details concerning the brake assembly 32, the boss 34, the threaded studs, the lug nuts, the rim 16 and the tire 22 are not believed to be necessary because they are entirely conventional.

In accordance with this invention, the spare wheel 10 is mounted outwardly alongside the main wheel 14 for joint rotation therewith about the axis A—A in a mounted state, as best shown in FIGS. 3 and 4, when the tire 22 is flat. The spare wheel 10 comprises an auxiliary rim 60 and a spare tire 62 mounted thereon. The auxiliary rim 60 has a hub portion 64 engaged with the hub wall 28 of the main rim 16 in the mounted state. The auxiliary rim 60 also has an annular flange portion 66 engaged with the side wall 30 of the flat tire 22 in the mounted state. The auxiliary rim 60 has an inwardly-facing wall whose contour, at least partially, conforms to the outwardly-facing hub wall 28 and the outwardly-facing side wall 30. For this purpose, since the main hub 18 of the conventional rim 16 is generally deeply recessed, the auxiliary hub portion 64 is generally well-shaped and extends into the recessed conventional rim 16. The hub portion 64 has a planar base 68 which engages the hub wall 28. Also, the flange portion 66 is integral with and extends radially from the hub portion 64 along a plane that is generally parallel to that of the base 68. The flange portion 66 rests against the side wall 30 and pushes the latter inwardly into the interior of the flat tire 22 so as to ensure a snug engagement therewith.

A circumferentially-extending support 70 having a generally U-shaped cross-section supports the spare tire 62 and positions the same so that the outer diameter of the spare tire 62 is larger than that of the flat tire 22. The larger diameter spare tire 62 is operative for supporting the flat tire 22 slightly above the roadway 26. The side-by-side dual mounting of the spare and flat tires enables the vehicle to be moved, i.e. driven, along the roadway 26 without the necessity for removing the flat tire 22 and the main wheel 14 on which it is mounted. The driver may drive to the nearest gas station or other location where the flat tire and/or the main wheel may be more conveniently and expertly repaired or replaced. The spare tire 62 is thus intended not as a permanent replacement, but as a temporary means for emergency road use.

In order to mount the spare tire in the aforementioned side-by-side mounted state alongside the flat tire, the hub portion 64 is formed with wall portions bounding at least one and, in the illustrated case, three, mounting holes 72, 74, 76. The hub portion 64 is also formed with additional wall parts bounding at least one and, in the illustrated case, two, clearance holes 78, 80. Each of the mounting and clearance holes is circular, and all of the holes are equi-angularly arranged about the axis A—A.

The clearance holes have a larger diameter than that of the mounting holes. The mounting holes 72, 74, 76 are intended to receive the threaded studs 46, 40, 42 in the mounted state and, for this purpose, the corresponding lug nuts 56, 50, 52 are first removed from the studs 46, 40, 42. The lug nuts 48, 54 are not removed from their studs 38, 44.

Then, the spare wheel is moved in the axial direction and positioned adjacent the main wheel 14. During this positioning, the mounting holes 72, 74, 76 are initially positioned to overlie the studs 46, 40, 42 and, thereupon, the studs 46, 40, 42 are inserted into the mounting holes 72, 74, 76 until the studs 46, 40, 42 extend through and past the mounting holes 72, 74, 76. At the same time, during said positioning, the clearance holes 78, 80 are initially positioned to overlie the studs 38, 44 and the lug nuts 48, 54 which are non-removably mounted thereon. Thereupon, the studs 38, 44 and the lug nuts 48, 54 are received with clearance in the clearance holes 78, 80. Thus, the larger diameter of the clearance holes is dimensioned to be slightly larger than the maximum width of the lug nuts which, as shown in the drawings, are polygonal in top plan view. Finally lug nuts 56, 50, 52 are replaced on the studs 46, 40, 42, respectively, and are threaded home until the nuts 56, 50, 52 engage the wall parts bounding the mounting holes.

As shown in FIG. 4, representative stud 46 extends through and past its mounting hole 72, and the lug nut 56 engages the wall parts bounding the hole 72. Also, FIG. 4 illustrates that the representative stud 44 and the representative lug nut 54 are received with clearance within the clearance hole 80. Thus, the two lug nuts 48, 54 always serve to fixedly secure the flat tire 22 on the vehicle, while the remaining lug nuts 56, 50, 52 are used not only to secure the spare wheel 10 onto the main wheel 14, but also to assist the nuts 48, 54 in securing the main wheel 14 to the vehicle.

Although the spare tire 62 is shown as being solid rubber, it can equally well be an inflated tire such as a heavy-duty bicycle tire. One advantage obtained in fabricating the spare tire 62 of solid material is that it can never become deflated and, hence, is always available for use. The spare wheel 10 is extremely compact in construction and, in a preferred embodiment, the cross-sectional diameter of the spare tire 62 is on the order of two inches. Hence, the spare wheel is not intended as a permanent tire replacement, but just for emergency roadway use. Concomitantly, the spare wheel occupies very little space and is correspondingly low in weight, and is far easier to manipulate than existing full-size or reduced-size spare wheels.

Although the spare wheel 10 has been illustrated as having three mounting holes and two clearance holes, different numbers of mounting holes and clearance holes are also within the spirit of this invention and, of course, there are many automobiles in current use which utilize greater or fewer numbers than five stud/nut pairs to maintain the main wheel on the vehicle. In such cases, the number of mounting and clearance holes will vary to correspond with the number and placement of the stud/nut pairs provided on the vehicle.

The spare wheel of this invention is intended to be sold either as a factory-supplied accessory together with the original purchase of an automobile, or as an off-the-shelf accessory.

The spare wheel of this invention need not be restricted solely to automobiles, but can equally well be used for any wheeled vehicles such as trailers, trucks, buses, tractors, etc.

Figures 5, 7:
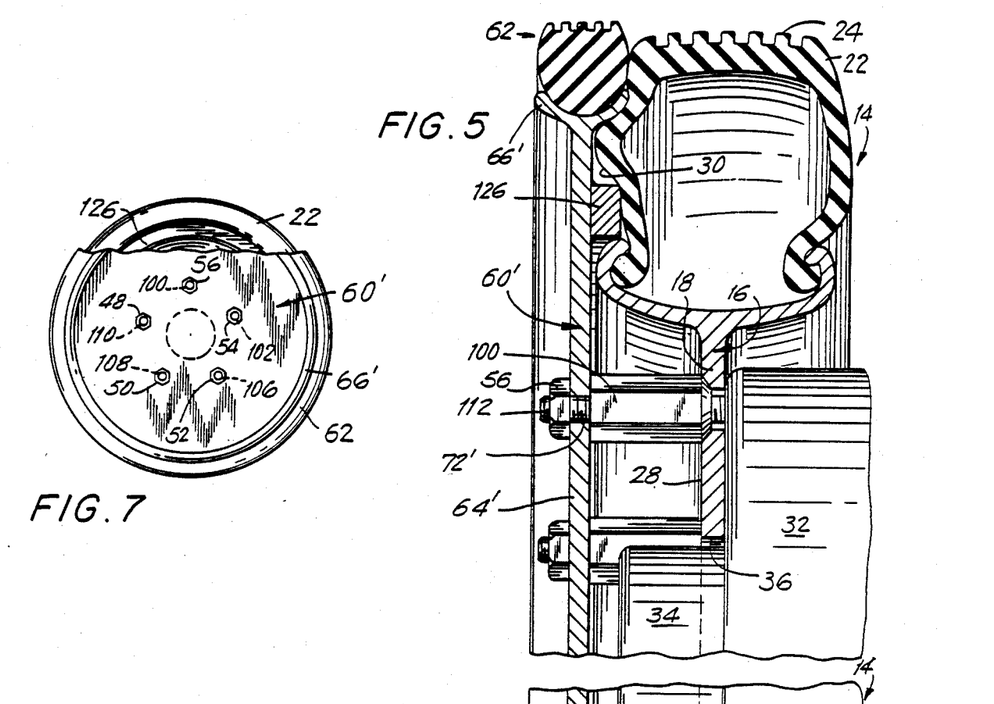
FIG. 5 is analogous to FIG. 4, but showing the upper half of a second embodiment of a spare wheel in accordance with this invention.
FIG. 7 is a view analogous to FIG. 2 of the FIG. 5 embodiment.
Figures 6, 8:
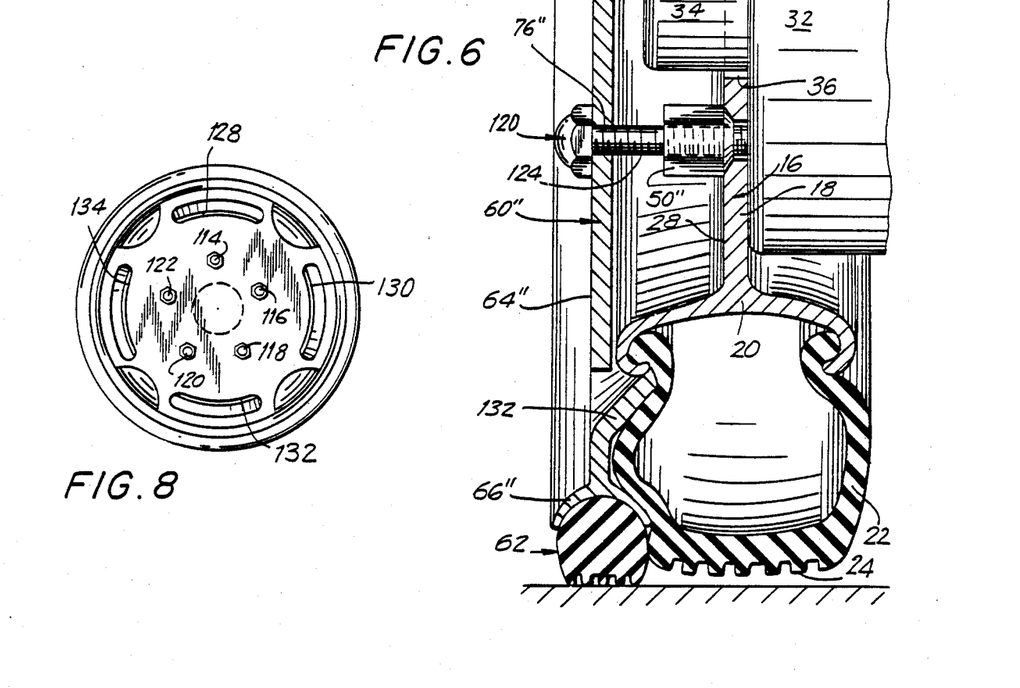
FIG. 6 is analogous to FIG. 4, but showing the lower half of a third embodiment of a spare wheel in accordance with this invention.
FIG. 8 is a view analogous to FIG. 2 of the FIG. 6 embodiment.

Turning now to FIGS. 5 and 6, a second and a third embodiment of a spare wheel are illustrated as being mounted alongside a main wheel which is identical in all respects to the main wheel 14 previously described; hence, like reference numerals have been used to identify like parts. However, rather than the auxiliary rim having a hub portion which is well-shaped and which is engaged with the hub wall 28, the auxiliary rims 60', 60" of FIGS. 5 and 6 are spaced in planes parallel to the hub wall 28, and also engage the main flanges 20 of the main wheels.

As shown in FIGS. 5 and 7, a plurality of elongated extensions or fittings 100, 102, 104, 106, 108 are mounted betwee the hub wall 28 and the auxiliary rim 60' which has a hub portion 64' and a flange portion 66'. Each extension has a tapped bore at one end, and a threaded rod portion at its opposite end. Each tapped bore threadedly receives a respective stud 38, 40, 42, 44, 46, and each threaded rod portion has a respective lug nut 48, 50, 52, 54, 56 threaded by mounted thereon. Each lug nut was previously mounted in a respective stud and, after removal therefrom, was mounted on the respective threaded rod portion of the extensions. The nuts are removed, each in its respective turn, and replaced by the extensions, one at a time. The hub portion 64' has wall parts forming a plurality of mounting holes, e.g. hole 72' in FIG. 5, into each of which the threaded rod portion, e.g. representative portion 112 of representative extension 100, is inserted. The representative nut 56 engages the wall parts bounding the mounting hole 72'.

As shown in FIGS. 6 and 8, a plurality of elongated extension bolts 114, 116, 118, 120, 122 are mounted between the hub wall 28 and the auxiliary rim 60" which has a hub portion 64" and a flange portion 66". Each bolt has a head at one end, and a threaded shaft extending from the head to the opposite end. Each shaft is threadedly received into a respective nut 48, 50, 52, 54, 56 threadedly mounted, and non-removably maintained, on the studs 38, 40, 42, 44, 46. Each nut has a threaded passage extending therethrough, and includes a first axial end region into which the respective stud is received, and a second axial end region into which each shaft is received. The hub portion 64" has wall parts forming a plurality of holes, e.g. hole 76" in FIG. 6, into each of which the shaft, e.g. representative shaft 124 of representative bolt 120, is inserted. The head of bolt 120 engages the wall parts bounding the mounting hole 76". The representative nut 50" in FIG. 6 can be a nut of conventional size, or advantageously may be a nut of enlarged length in order to provide more internal threads for the bolt shaft and for the threaded stud.

Returning to FIG. 5, an annular abutment or ring 126 is fixed on the hub portion 64', and the inner circumferential engaging surface of the ring 126 engages the outer peripheral surface of the main flange 20. Alternatively, as shown in FIG. 8, a set of stamped-out, resilient tongues are struck out of the plane of the hub portion 64". The tongues engage the outer peripheral surface of the main flange 20 at a plurality of locations around the axis of rotation.

Figure 9:
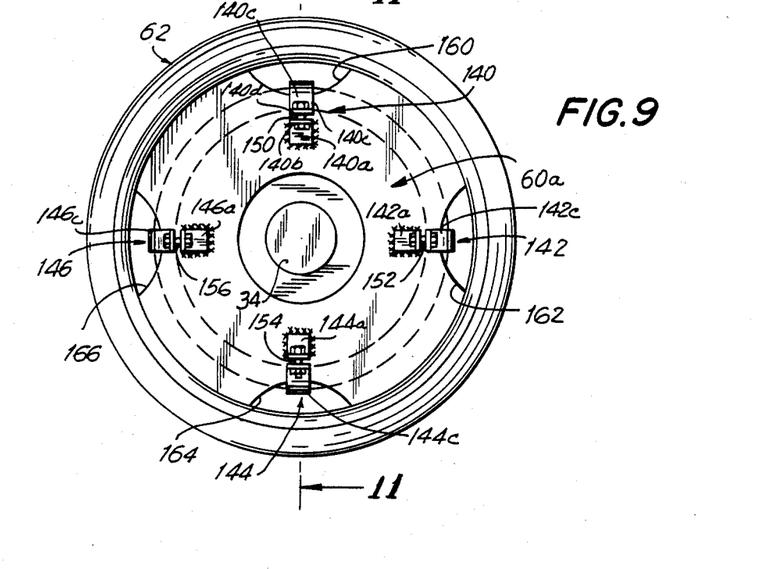
FIG. 9 is a view analogous to FIG. 2, but showing a fourth embodiment of a spare wheel in accordance with this invention.
Figure 10:
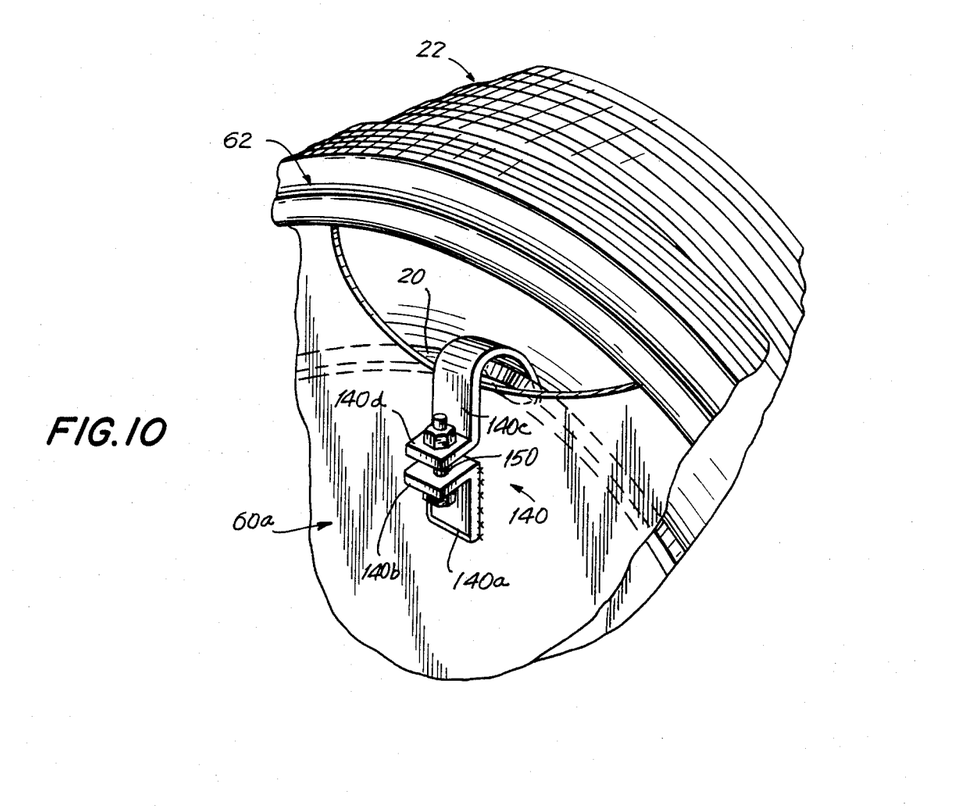
FIG. 10 is a perspective, close-up view of one of the connectors of FIG. 9 mounted on the main wheel.
Figures 11, 12:
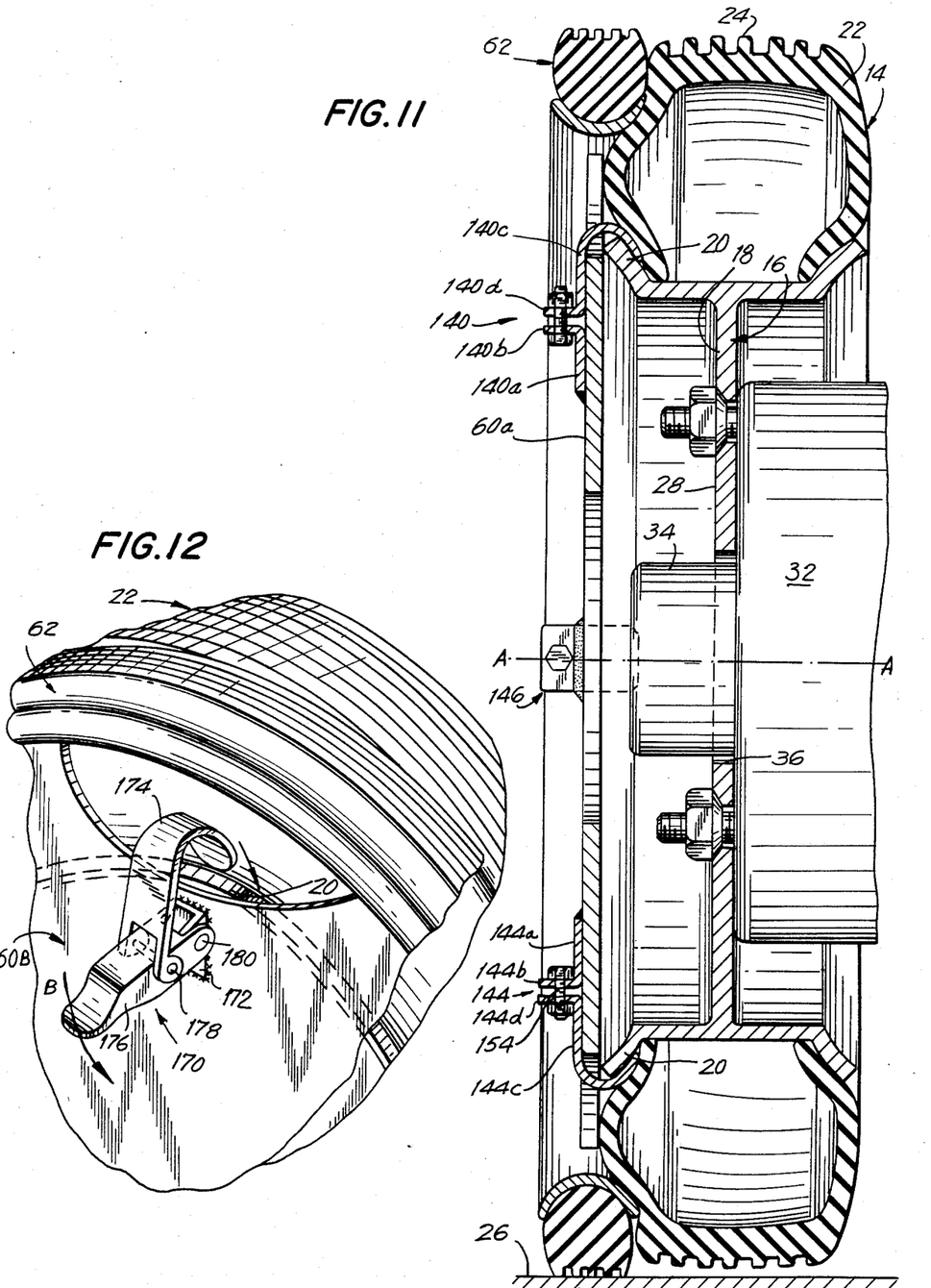
FIG. 11 is an enlarged sectional view taken along the broken line 11—11 of FIG. 9.
FIG. 12 is a view analogous to FIG. 10, but of a fifth embodiment of a spare wheel in accordance with this invention.

Turning now to FIGS. 9–12, a fourth and a fifth embodiment of a spare wheel are illustrated as being mounted alongside a main wheel which is identical in all respects to the main wheel 14 previously described; hence, like reference numerals have been used to identify like parts. However, rather than the auxiliary rim having a hub portion which is well-shaped and which is engaged with the hub wall 28, the auxiliary rim 60a of FIGS. 9–11 and the auxiliary rim 60b of FIG. 12 are respectively planar and spaced in planes parallel to the hub wall 28. As described below, the auxiliary rims 60a, 60b engage the main flanges 20 of the main wheels.

As shown in FIG. 9, a plurality of connectors 140, 142, 144, 146 are equiangularly arranged about the axis of rotation. Each connector has an L-shaped stationary part 140a, 142a, 144a, 146a stationarily mounted, e.g. by welding, to an outer wall of the auxiliary rim 60a. Each stationary part has an outwardly-extending flange, e.g. see representative flange 140b in FIG. 10. Each connector also has a hook-shaped movable part 140c, 142c, 144c, 146c mounted on the stationary part for movement relative thereto. Each hook-shaped part has an outwardly-extending flange, e.g. see representative flange 140d in FIG. 10. Flanges 140d, 140b overlie each other.

A set of bolts 150, 152, 154, 156 are mounted between the overlying flanges of each connector. Each bolt has a head adapted to be engaged by a turning tool, and a shaft extending between the flanges. A nut is provided on each shaft to maintain the respective bolt on and, in turn, the movable part connected to, the auxiliary rim.

Each hook-shaped part also has a hook which extends into cutouts 160, 162, 164, 166 formed in the auxiliary rim adjacent the connectors 140, 142, 144, 146, respectively. Each hook extends around the peripheral edge of the annular flange 20 of the main rim and clampingly engages the same from behind in the mounted state in which the spare wheel is mounted alongside the main wheel.

In use during a flat tire condition, one need only approach the main wheel from the side, and mount the spare wheel alongside the main wheel by placing the auxiliary rim 60a against the side wall of the flat tire, and loosely positioning the four hooks around and behind the main flange 20 of the main rim. Once so positioned, the four bolts are turned so that the movable parts are moved toward their respective stationary parts and, at the same time, the four hooks increasingly clampingly engage the main flange until the auxiliary rim is tightly clamped to the main rim. The nuts on the bolts insure that the auxiliary rim remains tightly clamped in place until the bolts are loosened.

In FIG. 12, the auxiliary rim 60b is held in place by a plurality of connectors, analogously to that described for the embodiment of FIGS. 9–11, except that instead of moving a movable part toward a stationary part by means of turning a threaded bolt, a snap-type connector is used. As shown in FIG. 12 for representative snap-type connector 170, the connector has a stationary part 172 welded to the rim 60b, and a movable hook-shaped part 174 pivoted to a lever 176 at pivot point 178. The lever 176 is pivoted to the stationary part 172 at pivot point 180.

To mount the rim of FIG. 12, after the four hooks are loosely positioned around the main flange 20, each lever is in turn pushed down in the direction of the arrow B until the pivot point 178 is below the pivot point 180, thereby locking each hook-shaped part to the main flange by a snap-type locking action.

The FIGS. 9–11 spare wheel embodiment is very easy to install, and there is no chance of having lost parts since all the necessary parts are mounted on the auxiliary rim. The FIG. 12 embodiment is even easier to install, because no turning tool is necessary.

To assist in the mounting of the spare wheel, a car ramp may be provided so that, in use, a driver may drive the main wheel having the flat tire on the ramp so that at least part of the main flange overhangs the ramp, thereby providing the driver with ready access to the main flange.

It will be understood that each of the elements described above, or two or more together, also may find a useful application in other types of constructions differing from the types described above.

While the invention has been illustrated and described as embodied in a spare wheel for and method of rendering a wheeled vehicle operational for emergency roadway use in the event of a flat tire condition, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A spare wheel for emergency roadway use of a vehicle in the event of a flat tire condition of a main wheel of the type having a main rim, a main flange and a flat tire mounted thereon, said spare wheel comprising:
   (a) an auxiliary rim;
   (b) means on the auxiliary rim for mounting the spare wheel outwardly alongside the main wheel for joint rotation therewith about an axis in a side-by-side mounted state during the flat tire condition, said mounting means including resilient tongues stamped out of and extending inwardly of the auxiliary rim, said tongues having innner circumferential, axially-extending engaging surfaces extending at least partly about the axis and supportably axially engaging the main flange at outer peripheral surfaces of the main flange in the mounted state; and
   (c) a spare tire mounted on the auxiliary rim, said spare tire having an outer diameter larger than that of the flat tire and operative for supporting the flat tire above the roadway in the mounted state, and for enabling the vehicle to be moved along the roadway despite the existence of the flat tire condition without the necessity for removing the flat tire from the vehicle.

2. The spare wheel as recited in claim 1, wherein the mounting means includes at least one connector having a first part stationarily mounted on the auxiliary rim, and a second part mounted for movement toward and away from the first part.

3. The spare wheel as recited in claim 2, wherein the second part is mounted for threaded linear movement relative to the first part.

4. The spare wheel as recited in claim 3, wherein the first part has a first flange, and wherein the second part has a second flange which overlies the first flange; and wherein the connector includes a bolt having a threaded shaft extending through the overlying first and second flanges, and a nut threadedly engaging the shaft.

5. The spare wheel as recited in claim 4, wherein the bolt has a head engageable with a turning tool for moving the second part between a non-locked state in which the second part is located further away from the first part, to the mounted state in which the second part is located closer to the first part.

6. The spare wheel as recited in claim 5, wherein the second part has a generally hook-shaped portion which lockingly engages the main rim in the mounted state.

7. The spare wheel as recited in claim 2, wherein the second part is mounted for snap-action movement relative to the first part.

8. The spare wheel as recited in claim 7, wherein the connector includes a lever pivotably mounted at a stationary pivot point to the first part, and wherein the second part is pivotably mounted at a movable pivot point to the lever, and wherein the lever is swingable from a non-locked state, to the mounted state in which the movable pivot point is located below the stationary pivot point.

9. The spare wheel as recited in claim 1, wherein the mounting means includes a plurality of connectors equiangularly spaced about the axis of rotation of the main wheel.

10. The spare wheel as recited in claim 1, wherein the main rim has a main hub with an outwardly-facing hub wall, and wherein the flat tire has an outwardly-facing side wall; and wherein the auxiliary rim has a hub portion engaged with the hub wall of the main rim in the mounted state, and an annular flange portion engaged with the side wall of the flat tire in the mounted state; and further comprising a plurality of threaded studs arranged in an annulus about the axis and extending through the main rim, and a plurality of lug nuts.

11. The spare wheel as recited in claim 10, wherein the studs extend through the main hub, and wherein the lug nuts are threadedly mounted on the studs and engage the main hub of the mounted main rim, at least one of the nuts being removable from and then replaceable on one of the studs during the flat tire condition, and at least another of the nuts being nonremovably maintained on another of the studs to maintain the main wheel on the vehicle during the flat tire condition; and wherein the hub portion has wall parts bounding at least one mounting hole through which the one stud extends in the mounted state after the at least one nut is removed from the one stud and then replaced on the same into engagement with the wall parts; and wherein the hub portion has additional wall parts bounding at least one clearance hole in which the other stud and the other nut maintained thereon are received with clearance in the mounted state.

12. The spare wheel as recited in claim 11, wherein the hub portion has wall parts bounding three mounting holes through which three studs respectively extend in the mounted state after three nuts are removed from three respective studs and then replaced on the same into engagement with the wall parts, and additional wall parts bounding two clearance holes in which two studs and two nuts maintained thereon are respectively received with clearance in the mounted state.

13. The spare wheel as recited in claim 10, wherein the spare tire is mounted around the annular flange portion of the auxiliary rim.

14. The spare wheel as recited in claim 10, wherein the auxiliary rim has an inwardly-facing wall whose contour, at least partially, conforms to the outwardly-facing hub wall and the outwardly-facing side wall of the flat tire.

15. The spare wheel as recited in claim 14, wherein the hub portion has a well-shape with a generally planar base, and wherein the flange portion is integral with and extends radially from the hub portion along a plane that is generally parallel to that of the base.

16. The spare wheel as recited in claim 10, wherein the lug nuts are threadedly removable from the studs during the flat tire condition, and wherein the main rim has a main hub with an outwardly-facing hub wall, and wherein the auxiliary rim has a hub portion spaced from the hub wall and having wall parts bounding mounting holes therethrough; and further comprising a plurality of elongated extension fittings, each extending between the hub portion and the hub wall, each fitting having a tapped bore in which a respective stub is threadedly received after the respective lug nut is removed therefrom, each fitting also having a threaded portion extending through a respective mounting hole and on which the respectively removed lug nut is threaded into engagement with the wall parts bounding the respective mounting hole.

17. The spare wheel as recited in claim 10, wherein each lug nut has a threaded passage extending therethrough, said passage having a first axial end region in which a respective stud is threadedly received, and a second axial end region, and wherein the main rim has a main hub with an outwardly-facing hub wall, and wherein the auxiliary rim has a hub portion spaced from the hub wall and having wall parts bounding mounting holes therethrough; and further comprising a plurality of elongated extension bolts, each extending at least partially between the hub portio and the hub wall, each bolt having a threaded shaft extending through a respective mounting hole and into threaded engagement with the second axial end region, each bolt having a head engaged with the wall parts bounding the respective mounting hole.

18. The spare wheel as recited in claim 10, wherein the main rim has a main hub with an outwardly-facing hub wall which lies in a generally vertical plane, and wherein the auxiliary rim has a hub portion which lies in a generally vertical plane that is generally parallel to that of the hub wall.

19. The spare wheel as recited in claim 18, wherein the engaging surfaces comprise an annular abutment on the auxiliary rim and engaged with the main flange in the mounted state.

20. A method of rendering a vehicle operational for emergency roadway use in the event of a flat tire condition of a main wheel of the type having a main rim, a main flange and a flat tire mounted thereon, said method comprising the following steps performed during the flat tire condition:
(a) axially moving and mounting a spare wheel having an auxiliary rim outwardly alongside the main wheel for joint rotation therewith about an axis in a side-to-side mounted state, including providing resilient tongues stamped out of and extending inwardly of the auxiliary rim, said tongues having inner circumferential, axially-extending engaging surfaces extending at least partly about the axis and supportably axially engaging the main flange at outer peripheral surfaces of the main flange in the mounted state; and
(b) mounting a spare tire on the auxiliary rim, and forming the spare tire with an outer diameter larger than that of the flat tire to support the same above the roadway and to enable the vehicle to be moved along the roadway despite the existence of the flat tire condition without the necessity for removing the flat tire from the vehicle.

* * * * *